United States Patent [19]

Heller

[11] 4,419,329
[45] Dec. 6, 1983

[54] DEVICE FOR PRODUCING HYDROGEN AND OXYGEN GASES

[76] Inventor: Charles H. Heller, 17 Beth Dr., Moorestown, N.J. 08057

[21] Appl. No.: 368,571

[22] Filed: Apr. 15, 1982

Related U.S. Application Data

[63] Continuation of Ser. No. 167,339, Jul. 9, 1980, abandoned.

[51] Int. Cl.³ ............ B01J 7/00; B01J 19/08; B01J 19/12
[52] U.S. Cl. .................. 422/111; 422/186; 422/187; 422/202; 422/222
[58] Field of Search ........... 422/186, 211, 222, 111, 422/202, 187; 204/128, 129; 429/111

[56] References Cited

U.S. PATENT DOCUMENTS

| | | | |
|---|---|---|---|
| 3,180,083 | 4/1965 | Heller | 422/174 |
| 3,248,872 | 5/1966 | Morrell | 422/173 |
| 3,389,972 | 6/1968 | Pottharst | 422/177 |
| 3,758,278 | 9/1973 | Weber | 422/177 |
| 3,798,005 | 3/1974 | Koch | 422/222 |
| 3,993,653 | 11/1976 | Blum et al. | 204/129 |
| 4,033,133 | 7/1977 | Houseman et al. | 422/211 |
| 4,042,481 | 8/1977 | Kelly | 204/129 |
| 4,053,576 | 10/1977 | Fletcher | 422/186 |
| 4,105,528 | 8/1978 | Hasebe | 204/237 |
| 4,107,008 | 8/1978 | Horvath | 204/129 |
| 4,254,086 | 3/1981 | Sanders | 422/187 |
| 4,332,775 | 6/1982 | Genequand et al. | 422/186 |

Primary Examiner—Bradley Garris

[57] ABSTRACT

A device to disassociate combustion product compounds such as water into hydrogen and oxygen gases is provided, including a tube to pass steam through a layered P-N semi-conductor system by which excess electrons are added to the steam, heat is added to the steam, a sweeping magnetic field to accelerate the steam ions in a swirling motion to cause the steam mass to accumulate high velocity kinetic energy and a porous plug of a catalyst metal, such as platinum, splitting the steam ions into oxygen and hydrogen.

13 Claims, 14 Drawing Figures

DEVICE FOR PRODUCING HYDROGEN AND OXYGEN GASES

This application is a continuation of U.S. patent application Ser. No. 167,339 filed July 9, 1980 now abandoned.

DESCRIPTION OF PRIOR ART

This invention relates to an apparatus for the decomposition of certain organic and inorganic combustion product compounds to form the component elements which may then be used as fuel and oxygen separately or in a recombination to liberate the heat of combustion. Although much of this specification will refer to and relate to the disassociation of water into its component parts of oxygen and hydrogen according to the following formula, the invention, both the device and the method are in no way limited to that particular decomposition system:

$$2H_2O \xrightarrow{\pm E} 2H_2 + O_2$$

The apparatus and method of this invention is effective in disassociating other combustion products, particularly organic compounds such as a mixture of carbon dioxide and water, which may be disassociated in this apparatus according to the following formula:

$$2CO_2 + 6H_2O \xrightarrow{\pm E} 2CH_4 + 2H_2 + 5O_2$$

It will be clear to those skilled in the art that other compounds may be used in the apparatus so long as the inlet compounds may be inserted in a vapor or gaseous condition and that the disassociation products can likewise be collected as gases. Therefore, wherever this specification speaks of disassociation of hydrogen and oxygen it is intended to include disassociation of other combustion product compounds such as carbon dioxide and the like with or without the presence of water.

This invention more specifically relates to a new apparatus and method for the disassociation of hydrogen and oxygen from the water molecule. Many methods have been used to separate the water molecule as there is a great and continuing utility for both hydrogen and oxygen gas. More recently, there has been an increased interest in the use of hydrogen as a fuel for internal combustion engines for use in automobiles and the like. The clean burning characteristics as well as the freedom from any significant pollution problem makes the combustion of hydrogen a prime candidate as an energy source in the future. Unfortunately, the expense of energy in splitting water into hydrogen and oxygen is expensive and is not yet practical as a source of fuel.

The prior art is laden with various processes and apparatus for the decomposition of water. A recent apparatus is described in U.S. Pat. No. 4,105,528 to Hasebe, wherein the electrolyte (NaOH) is subjected to the electrolysis between two electrode under the function of the potential magnetic field formed by the coil current which is generated by the electrodes with active movement of an electrolytic ion so that the electrolysis of water takes place smoothly under the spin functions of the atom and the electron. This apparatus carries the process to the point where there is a mixture of hydrogen and oxygen with both gases leaving the apparatus in a mixture. The methods of separating the hydrogen and oxygen mixture, even though it be an explosive, is well within the prior art.

The inventor, Horvath, in U.S. Pat. No. 4,107,008, describes an electrolysis method for producing hydrogen and oxygen. The general field of electrolysis is well covered in that background section while describing an extremely high frequency electromagnetic radiation technique to increase the possibility for collision between the electrons and the ions with a subsequent improved yield.

The U.S. Pat. No. 3,929,433, to Lucero, describes a separation of ions from gases and liquids including sea water as well as other organic and inorganic materials wherein the gas is subjected to ultraviolet radiation to make predetermined ions more susceptible to a magnetic field established within the fluid by a magnet positioned around or within the enclosure. A different process is described in U.S. Pat. No. 4,144,147, to Jarrett, et al, wherein the photolysis of water using rhodate semiconductive electrodes is described. The cell exposed to sunlight using a rhodate cathode and an n-type $TiO_2$ anode decomposes the water and generates electric power.

In U.S. Pat. No. 2,927,232, to Luce, heavy water is injected into a confining magnetic field perpendicular to the lines of magnetic force. J. L. Lawson, in his U.S. Pat. No. 2,738,420, describes an apparatus wherein charged particles are injected such that each electron repeatedly circulates along the orbit gaining upon each turn an amount of energy in electron volts equal to the instantaneous voltage which would be induced by the time varying magnetic flux in a single turn of wire placed at the orbit position. This Betatron is used for acceleration of high energy particles. The Vandegraff generator utilized high voltage of 20,000 to 30,000 volts in order to strip excess electrons from the surface of certain materials. These later devices utilized an even higher voltage drop of one to two million volts. It is an object of this invention to utilize a low voltage device while utilizing a high kinetic energy obtained through velocity of the molecules None of these devices and methods provide the answer to the needs of an inexpensive and efficient method of disassociate combustion-type compounds, such as water into its component parts. Accordingly, it is an object of this invention to provide an energy efficient apparatus and method to form a separable mixture of the combustible compounds and oxygen from combustion compounds products.

It is an additional object of this invention to provide an apparatus and method to disassociate and separate water into its component parts of hydrogen and oxygen gases.

It is a further object of this invention to provide an apparatus and method to disassociate a combination of carbon dioxide and water into a combustible mixture of methane and hydrogen separable from the oxygen gas.

It is a further object of this invention to provide an apparatus and method to accelerate the velocity of compound particles such as water vapor, to an extremely high speed accumulating a high level of kinetic energy to the mass.

It is an additional object of this invention to provide a method and apparatus by which compounds raised to a high velocity kinetic energy level may be broken into its component parts in a continuous process.

It is an object of this invention to provide a device to accelerate molecules to high velocity including such compounds as water, carbon dioxide and the like.

It is a specific object of this invention to provide a device to create an elevated electric field around a column of combustion products compounds such as water, carbon dioxide and the like.

It is an additional object of this invention to use velocity of a gas to store thermal energy in the form of kinetic energy.

SUMMARY OF THE INVENTION

The apparatus is provided to disassociate combustion product chemical compounds into their component parts such as water into hydrogen and oxygen gases. A tube to carry the compound is provided with a heat source to transfer heat to compound flowing in the tube. The tube is constructed to include a device for adding excess electrons to the compound inside the tube. The tube is preferably constructed of a semiconductor sandwich with a non-ferrous metal, such as copper, on the inside surface with the P-function material on the inside of the sandwich and the N-function material on the outside of the tube. A sweeping magnetic field device is provided to accelerate the compound ions in a swirling motion inside the tube and to cause the steam mass to accumulate a high degree of velocity kinetic energy. A disassociation catalyst device, preferably in the form of a porous plug of catalyst metal in the tube in the path of the steam to allow the high velocity kinetic energy steam to pass through the plug. A collecting device to separate, collect and store the hydrogen and oxygen gases is provided.

Throughout the specification the term "reactant compound" is used to refer to the chemical compounds which are supplied to the apparatus of this invention for disassociation into oxygen gas and a fuel gas or a mixture of fuel gases. In addition, the term "combustion product compound" is used to describe those chemicals which contain oxygen and could have been formed by a combustion reaction in that disassociation into their component elements includes not only oxygen but some oxydizable element or elements. For use in the device of this invention, it is required that the combustion product compounds be gaseous in nature at the temperature of the inlet stream. Most of the specification will relate to a generic group of compounds gaseous in nature at the inlet temperature being fully or partially oxygenated hydrogen and carbon compounds. The combustion product compounds preferred are chosen from the group consisting of water and a mixture of water and carbon dioxide. Water is particularly preferred.

The balance of this section relates to embodiments of the invention and should be considered preferred. The high degree of kinetic energy is obtained by a combination of high velocity rotational flow planar with the sweeping magnetic field together with lateral transport flow. Heat is added during the high speed flow to add to the kinetic energy. The sweeping magnetic field is preferably obtained by a stators procuring a rotating magnetic field by the use of alternating current. In this fashion there are no moving mechanical parts and only the magnetic field and the steam move. The steam is introduced into the apparatus through a constant entropy nozzle. The low pressure steam is maintained in that condition and further heated by a high temperature working fluid from an external heat source during the flow. Of prime consideration is the construction of the tube in the form of a reactor helix coil is heat transfer to the reactant compound and providing sufficient room for the magnetic field windings. It is preferred that the cross section of the reactor tube be elliptical in shape with the maximum diameter being about three times that of the minimum diameter. The magnetic field across the narrow diameter of the elliptical cross section includes a helical part of the flux circuit of sheet metal laminations. The water vapor is charged with excess electrons as it passes through the reactor. The sweep magnetic circuit produces a magnetic field which carries the charged particles of steam to higher velocity such that they store the incoming additional heat energy in the form of kinetic energy according to the formula $KE = \frac{1}{2} mV^2$. Magnetic field accelerates the ionized particles of steam causing them to travel in tight circles inside the reacting tube. Thus the steam is subject to two motions, one the traveling motion along the tube plus the circular motion caused by the magnetic field. The circular motion is at right angles to the general flowing motion of the steam molecules caused by the expansion of the steam through the steam nozzle and into the vacuum. The magnetic field does not significantly affect the velocity of the steam particles along the tube toward a vacuum pump at the end. In fact, the velocity remains relatively constant and is imparted only the expansion of the steam through the nozzle. The steam undergoes an enthalapy change from State 2 to State 3 in the tube and is converted into kinetic energy of velocity. The magnetic field rotates in a direction opposite to the drifting flow velocity of the steam. An advantage of the drift flow and the rotating magnetic field being in opposite directions is to provide contact of the steam in the magnetic field to produce the final required velocity. The catalyst device preferably includes a porous plug constructed of plantinum, palladium or like metals, more preferably platinum. The high velocity kinetic energy of the compound flow dissipating at the plug in a catalytic reaction disassociates the compound to form the component parts, such as oxygen and hydrogen gas. High kinetic energy steam is converted on the surface of the porous plug to rearrange the electrons and split the compound. The porous plug is preferably fine shreddings packed tightly inside a slate cylinder. By the time the steam molecules reach the catalyst plug they have reached a velocity in the range of about 16,000 feet/second. It is preferred that the velocity be at least 10,000 feet/second and more preferred that it be at least 15,000 feet/second. A gradual ground is provided within the cylinder to avoid a spark. The process includes the release of the kinetic energy at a point to increase the orbital energy of the atoms to the higher energy level.

The construction of the inner reaction tube is such to bring excess electrons as well as heat energy from the outside to the reactant compound inside the tube where the electrons and the heat are picked up by the reactant gas steam flowing across the inside surface. The excess electrons tend to weaken the covalent bond of the reactant molecule, causing ionization. For example, the steam would be ionized. As the velocity of the swirling steam is increased, its ability to sweep excess electrons off the inner surface of the inner reacting tube is increased. Thus, the effect is compounded as additional electrons aid in increasing the velocity so as to ultimately obtain the high velocity kinetic energy necessary to cause disassociation of the water molecules. The preferred outer layer of the reactor tube is an N-type material such as silicon ribbon semiconductor material. The inside layer is copper sandwiching the interior layer which is the P-type silicon material. The construction is such that once electrons cross the P-N junction they are trapped inside the tube and carried off by the steam stream. In this construction, it is important that the P-N junction be able to withstand a potential of about 15 volts as the device acts as a diode. The external magnetic circuit encloses the helix reactant tube to provide an alternating flux.

Inside the inner reactant tube excess electrons are added to the steam causing the steam to ionize creating an electric field of voltage above ground in the steam. The sweeping magnetic field created between an inner stator circuit and outer circuit windings accelerates the steam ions. This acceleration causes the mass of steam to store heat energy and magnetic energy from the rotating magnetic field in kinetic energy of the steam molecules. When an equivalent energy to 13.5 electrons volts is reached steam may be converted to hydrogen and oxygen. In the second state of the reaction, the steam of high velocity kinetic energy is passed through a porous plug of catalyst metal, preferably platinum or paladium and more preferably platinum. The steam in passing through the plug gives up kinetic energy and that goes to push the electrons of each steam atom further apart leaving room for rearrangement of the electrons of the steam to form hydrogen and oxygen. The kinetic energy accumulated in the molecules is stored in a stable form of the hydrogen and oxygen molecules.

DESCRIPTION OF PREFERRED EMBODIMENTS

Figure 1:
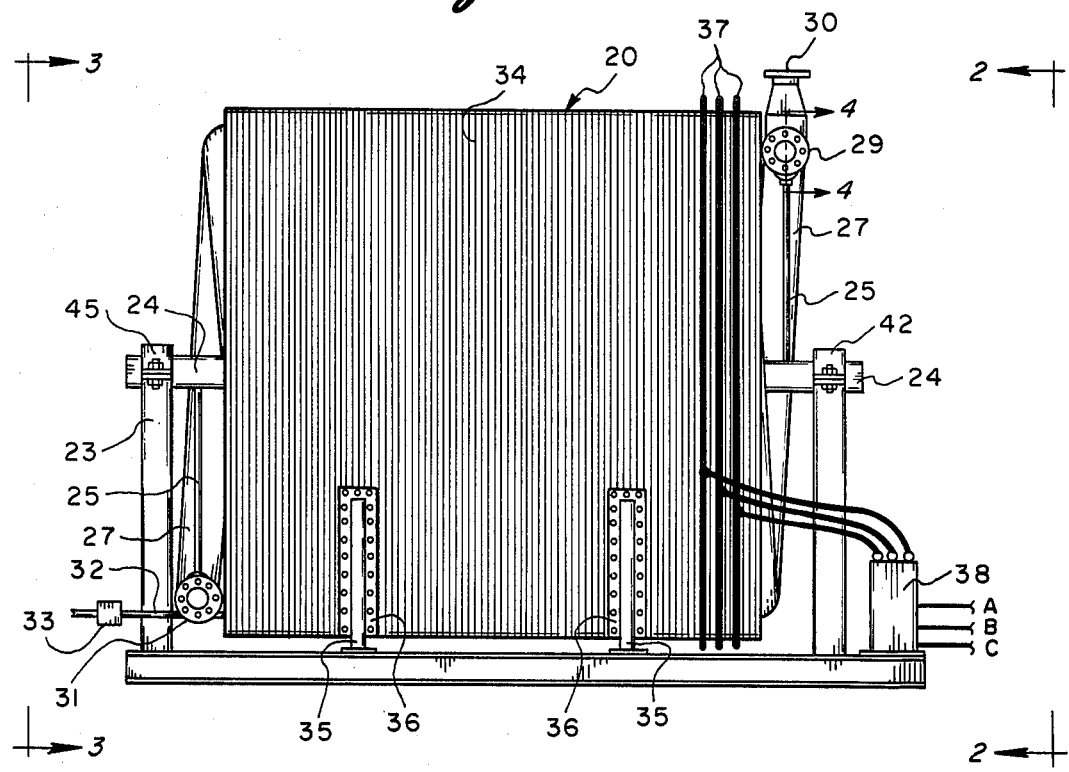
FIG. 1 is a side elevational view of the oxygen-hydrogen producing device of this invention.
Figure 2:
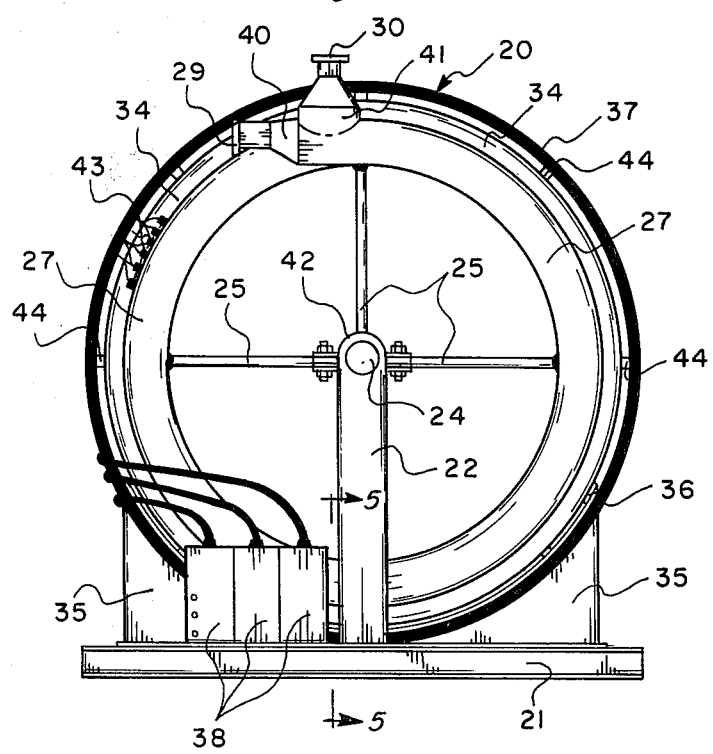
FIG. 2 is a front end view of the device of this invention shown in FIG. 1.
Figure 4:
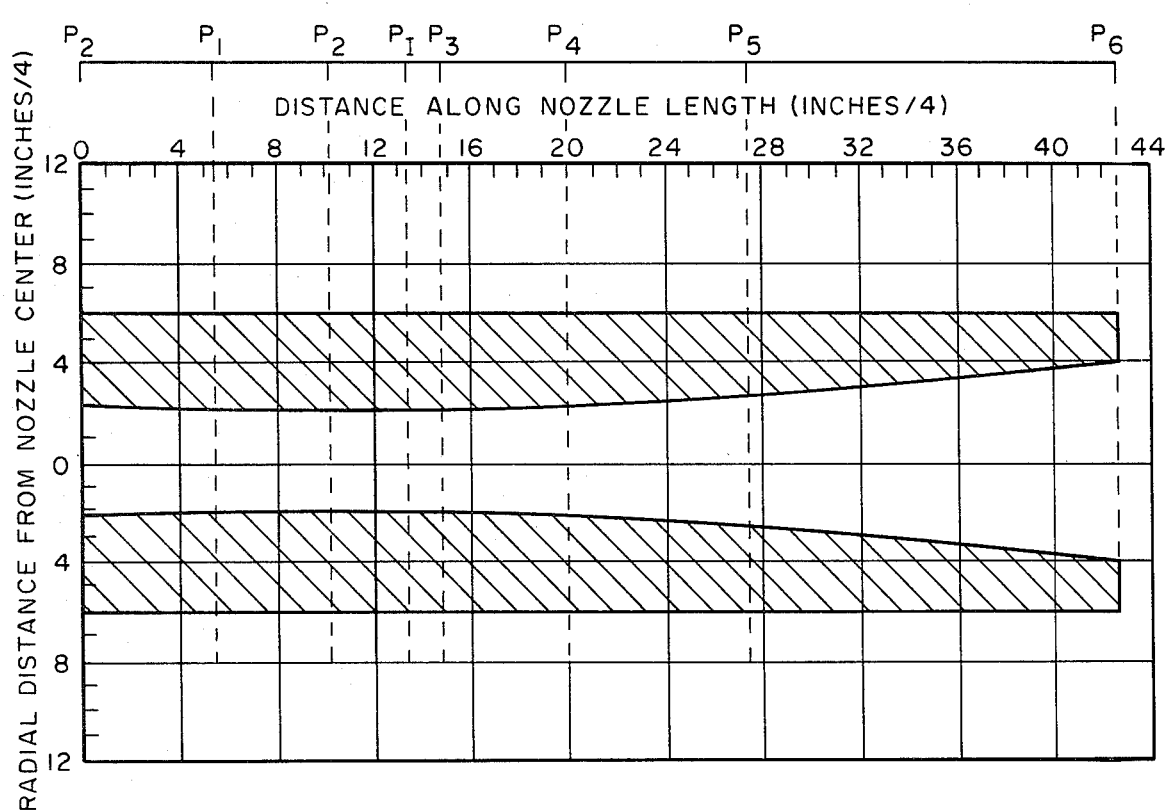
FIG. 4 is a cross-sectional view and table of the input nozzle along lines 4—4 of FIG. 1.

Fuel producer 20 is shown in a side elevational view in FIG. 1 mounted on foundation 21 constructed of twelve inch steel "I" beams together with a ¼ inch steel flooring all securely fastened to a twelve inch thick concrete floor. Front end pedestal support 22 and rear end pedestal support 23 are both bolted and pinned to foundation 21 "I" beam. Pedestal supports 22 and 23 are constructed of ¾ inch steel welded to form square cross-section beam extending a height to hold twelve inch diameter schedule 80 steel pipe main helix support 24. Extending radially from and welded into main helix support 24 are helix support rods 25 which are constructed of one and ½ inch diameter steel pipe welded shut before being welded at one end to main helix support 24 and securely fastened with plate and screws at the other end to the inner magnetic circuit in helix tube 27. Helix support rods 25 are located one for each 90° of turn of helix tube 27. Steam inlet port 29 is a ten inch steel pipe line to supply 28 psig steam for separation into hydrogen fuel and oxygen. As pointed out hereinabove, fuel producer 20 is capable of breaking not only steam into hydrogen and oxygen gases but also a mixture of carbon dioxide and steam into a mixture of methane, hydrogen and oxygen which can also be easily separated into a fuel mixture. If the latter fuel mixture is desired, a mixture of three moles steam and one mole carbon dioxide enters at inlet 29. For simplicity the present description will relate to a run using steam supplied to inlet 29 from a source not shown. Heating fluid inlet 30 is a six inch diameter Schedule 40 steel pipe for 5 psig steam which is typically supplied from a solar collector or other heat source. Oxygen and hydrogen gases leave fuel producer 20 from exit port 31 and condenser drain tube 32 is connected to the hearing jacket into which steam enters from inlet 30 to remove condensed water from the bottom of each loop of the helix tube 27. Drain tube 32 is equipped with 15 psig standard Crane bucket steam trap 33 in the drain line. External magnetic lamination system 34 is held in position by cradle supports 35 welded on the bottom edge to foundation 21 and at the upper end to support plates 36 which are in turn screwed to the external magnetic laminates 34. External magnetic circuit 34 through its coils, is electrically connected to bus bars 37 which, in turn, are electrically connected to frequency tripler 38 with three external circuit leads "A", "B" and "C". In FIG. 2 a front end elevational view further illustrates steam inlet port 29 together with nozzle 40 which conditions the inlet steam according to the positions shown in the graph of FIG. 4 of pressures at certain points in the nozzle according to the following table:

TABLE I

| DATA AND CROSS SECTION OF CONSTANT ENTROPY NOZZLE | |
|---|---|
| STATE Pa | STATE Pa |
| P = 28 psig | P = 14.768 psig |
| P = 42.696 psia | P = 20.464 psia |
| T = 271.2° F. | T = 249.30° F. |
| h = 1165.2 B.T.U./lb. | h = 1117.94 B.T.U./lb. |
| v = 9.591 ft.$^3$/lb. | v = 13.316 ft.$^3$/lb. |
| X = 97.09% | X = 95.16% |
| Y = 2.91% | Y = 4.84% |
| $V_t$ = 380.09 ft.$^3$/min. | w = .661 lbs./sec. |
| w = 39.63 lb/min. | A = .813 in.$^2$ |
| S = 1.6343 in. | L = 2.519 in. |
| | $\tau$ = 2.813 × 10$^{-4}$ sec. |
| | D = 1.029 in. |
| STATE P$_1$ | STATE P$_t$ |
| P = 21.38 psig | P = 9.97 psig |
| P = 36.080 psia | P = 24.67 psia |
| T = 261.08° F. | T = 239.33° F. |
| h = 1139.54 B.T.U./lb. | h = 1103.55 B.T.U./lb. |

TABLE I-continued
DATA AND CROSS SECTION OF CONSTANT ENTROPY NOZZLE

| | |
|---|---|
| $v = 11.116$ ft.$^3$/lb. | $v = 15.533$ ft.$^3$/lb. |
| $X = 96.12\%$ | $X = 94.06\%$ |
| $Y = 3.88\%$ | $Y = 5.94\%$ |
| $w = .661$ lbs./sec. | $w = .661$ lbs./sec. |
| $A = .971$ in.$^2$ | $A = 0.8549$ in.$^2$ |
| $L = 1.319$ in. | $L = 3.33$ in. |
| $\tau = 2.020 \times 10^{-4}$ sec. | $\tau = 3.207 \times 10^{-4}$ sec. |
| $D = 1.081$ in. | $D = 1.0433$ in. |

| STATE P$_3$ | STATE P$_5$ |
|---|---|
| $P = 8.152$ psig | $P = 5.080$ psig (20.346"Hg.) |
| $T = 235.12°$ F. | $T = 191.36°$ F. |
| $h = 1097.2$ B.T.U./lb. | $h = 1040.67$ B.T.U./lb. |
| $v = 16.607$ ft.$^3$/lb. | $v = 35.74$ ft.$^3$/lb. |
| $X = 93.6\%$ | $X = 89.64\%$ |
| $Y = 6.40\%$ | $Y = 10.36\%$ |
| $w = .661$ lbs./sec. | $w = 0.661$ lbs./sec. |
| $A = 0.8699$ in.$^2$ | $= 1.3740$ in.$^2$ |
| $L = 3.68$ in. | $L = 6.83$ in. |
| $\tau = 3.372 \times 10^{-4}$ sec. | $\tau = 4.959 \times 10^{-4}$ sec. |
| $D = 1.0524$ in. | $D = 1.3227$ in. |

| STATE P$_4$ | STATE P$_6$ |
|---|---|
| $P = 1.536$ psig | $P = 11.696$ psig ($-23.82$"Hg.) |
| $P = 16.232$ psia | $P = 3.0$ psia |
| $T = 217.04°$ F. | $T = 141.48°$ F. |
| $h = 1074.05$ B.T.U./lb. | $h = 971.3$ B.T.U./lb. |
| $v = 22.47$ ft.$^3$/lb | $v = 100.97$ ft.$^3$/lb. |
| $X = 91.99\%$ | $X = 85.05\%$ |
| $Y = 8.01\%$ | $Y = 14.95\%$ |
| $w = 0.661$ lbs./sec. | $w = 0.661$ lbs./sec. |
| $A = 1.0128$ in.$^2$ | $A = 3.1018$ in.$^2$ |
| $L = 4.97$ in. | $L = 10.689$ in. |
| $\tau = 3.919 \times 10^{-4}$ sec. | $\tau = 5.570 \times 10^{-4}$ sec. |
| $D = 1.1356$ in. | $D = 1.987$ in. |

Heat supply inlet 30 expands through housing 41 to supply a jacket around an inner helix tube which is described below. In this view, helix support rods are shown extending radially from main helix support 24 to various positions on helix tube 27. Top end 42 of front end pedestal support 22 is a bolted on flanged steel cap extending over and tightened on main helix support 24. A schematic showing of the external magnetic field and which is illustrated as windings 43 is not intended to show all of the windings but is merely an indication of the field and winding system located not only at that point but entirely around the circumference of external magnetic lamination system 34 with detail to be provided later. Bus bars 37 are supported by glass fiber reinforced epoxy resin rod supports 44 which are screwed to external laminated magnetic system 34.

Figure 3:
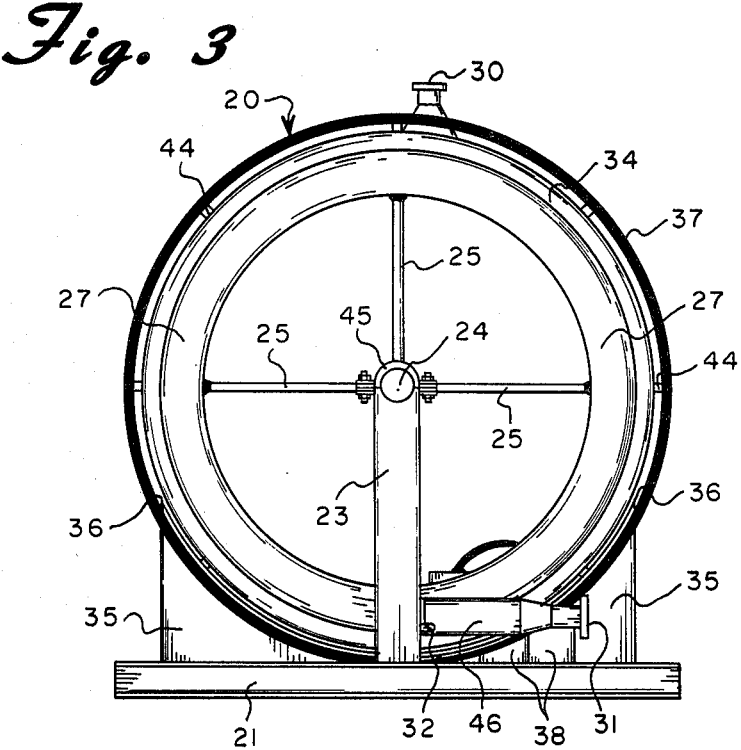
FIG. 3 is a rear end view of the device shown in FIG. 1.

In FIG. 3 a rear view elevational is provided illustrating fuel producer 20 with catalytic metal plug reactor 46 located at the termination of helix tube 27 directly in the gas stream before exit port 31. Flanged cap 45, similar to cap 42 is bolted on the top of rear end pedestal support 23 to hold helix support 24 in place.

Attached directly at exit port 31 is a vacuum pump not illustrated. That pump is a 30 horsepower 885 RPM, Model No. AT-704, available from the Nash Engineering Company of Norwalk, Conn. This vacuum pump is used for three purposes, the first being to produce a vacuum in the interior working tube of helix tube 27 of fuel producer 20. The vacuum supplied is a minimum of 23.28 inches of mercury. The vacuum allows for the pressure drop across catalytic metal porous plug reactor 46 of about 1.0 psig. The second purpose of the Nash vacuum pump is its utilization of water as the compressing medium. Any gases (steam) that have not disassociated to hydrogen and oxygen after passing through reactor 46 are in the form of super cooled water vapor and are condensed on contact with the chilled water in the vacuum pump. The non-condensable gases, hydrogen and oxygen, are combustible but the vacuum assures that the molecules of the gases are sufficiently separated that they cannot react with each other. As the gaseous mixture passes through the Nash vacuum pump it is cooled to 40° F. further avoiding an explosion. Lastly, the Nash pump acts as a compressor when used in reverse. The hydrogen and oxygen gases passing through the vacuum pump are compressed to atmospheric pressure, or a little higher. The gases are separated by an amine solution using techniques well known in the art and as long as the gases are cooled while passing through the compressor there is no danger of combustion.

Figure 5:
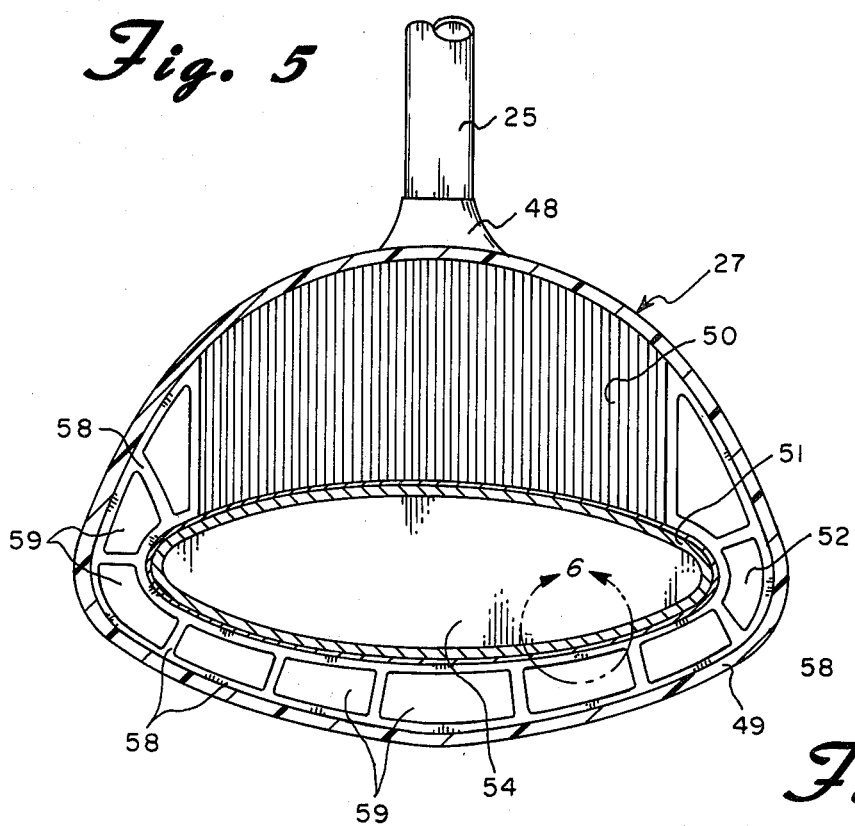
FIG. 5 is a cross-sectional view of a section of the loop taken along lines 5—5 of FIG. 2.
Figure 6:
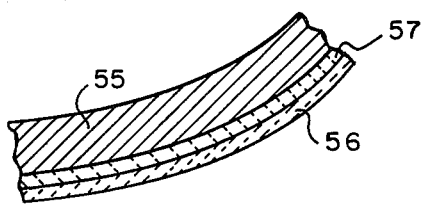
FIG. 6 is an expanded view of the laminate construction of the inner tube.

FIG. 5 is a cross-sectional view taken along lines 5—5 of FIG. 2 showing the internal construction of helix tube 27 as supported by helix support rods 25 threaded into flange 48 screwed directly into sheet laminations 50 and sealed permanently to the surface of exterior tube housing 49 composed of a ⅜ inch thick glass fiber tape reinforced epoxy thermoset resin. Inner elliptic laminate reaction tube 51 is attached to sheet metal laminations 50 with epoxy resin impregnated hemp. Inside magnetic circuit laminate 50 serves to give mechanical backing and strength to inner reactant tube 51 and also to the outer housing of the helix reactor 27. Template 58 is about 0.125 inch thick polypropylane polymer snap fitted around tube 51 providing an open type structural frame with openings 59 so as not to obstruct passageway 52 in which steam entering inlet 30 flows to conduct heat through the wall of tube 51 to the steam passing inside in passageway 54. Templates 58 are spaced about four inches apart along tube 51 as they provide initial structural support only when housing 49 is wrapped around and molded to form the exterior of tube 27. The structure of inner reactant tube 51 is further illustrated in the expanded cross-sectional view in FIG. 6 showing the interior surface abutting passageway 54 as 0.056 inch thick copper sheet 55 and 0.010 inch thick N-type ceramic material 56 facing passageway 52 with the two sheets sandwiching 0.010 inch thick in between P-type ceramic material 57. The cross-sectional area of elliptical tube 51 is determined by an eccentricity equal to 0.15. The laminated steel magnetic plate 50 are 6 inches wide and extend about ninety degrees of the loop over lapped to varying distances, bolted together with insulating bolts to form a continuous loop.

Figure 7:
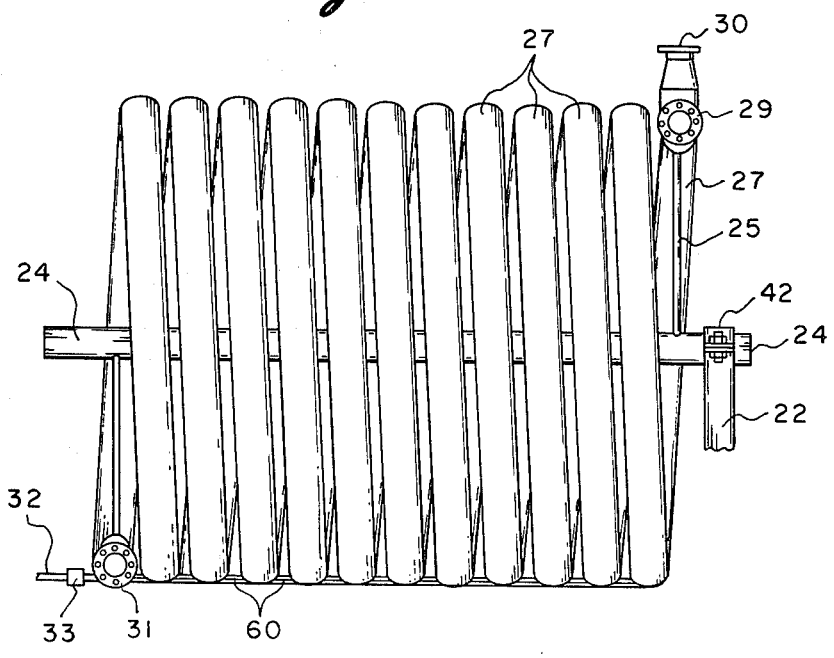
FIG. 7 is a side elevational view of the helix tube with the outer devices removed to show the inner detail.

In FIG. 7 external magnetic lamination system 34 has been removed to better show the full helical shape of helix tube 27. Condensation drain line 32 is shown as it connects to condensation drain line 60 as it passes under the bottom of each helical coil of 27 connected through openings to the bottom of each coil for removal of condensation from passageway 52 all being connected in series to vapor trap 33.

Figure 8:
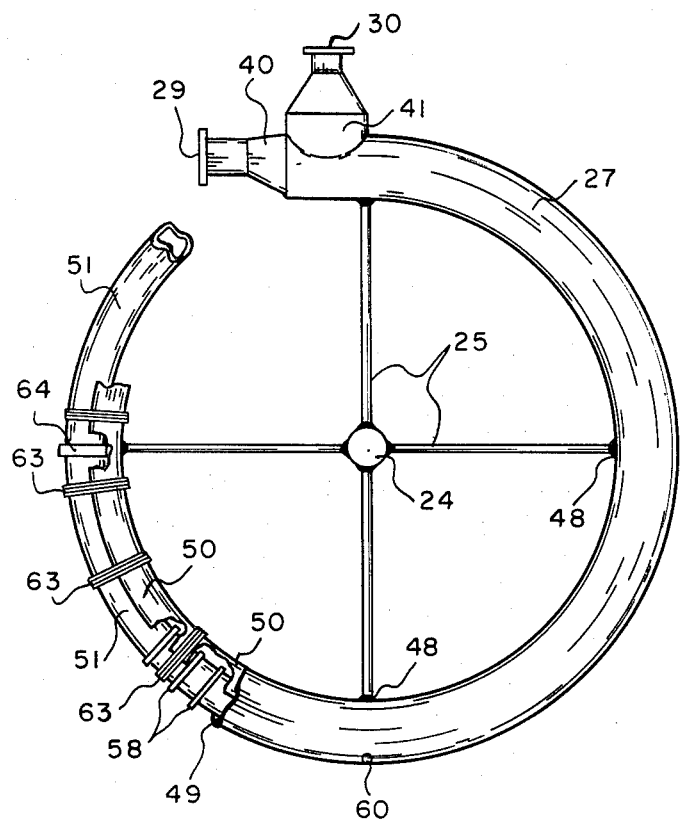
FIG. 8 is a partially cut-away view of the first loop of the helix tube with the center supporting mechanism.

In FIG. 8 the first partial loop of helix tube 27 is shown partially broken away to show the internal construction for clarification. Laminate housing 49 is first broken away to display inner elliptic tube 51 attached to sheet metal lamination circuit 50 both being tied together with hemp impregnated with epoxy resin. Sections of inner elliptic tube 51 are joined with silicon rubber seal 64 shown by partial cut away of metal laminations 50. Silicon seal 64 is a ¾ inch thick cylinder about four inches in length with an inside shape to conform to the outside shape of tube 51. From each end is a one and three-quarters inch wide groove on the inside surface cut approximately ⅜ inch deep to receive adjacent edges of section of helix tube 27. Ninety degree sections of helix tube 27 are joined by sealing each section inside silicon rubber ring seal 64.

Figure 9:
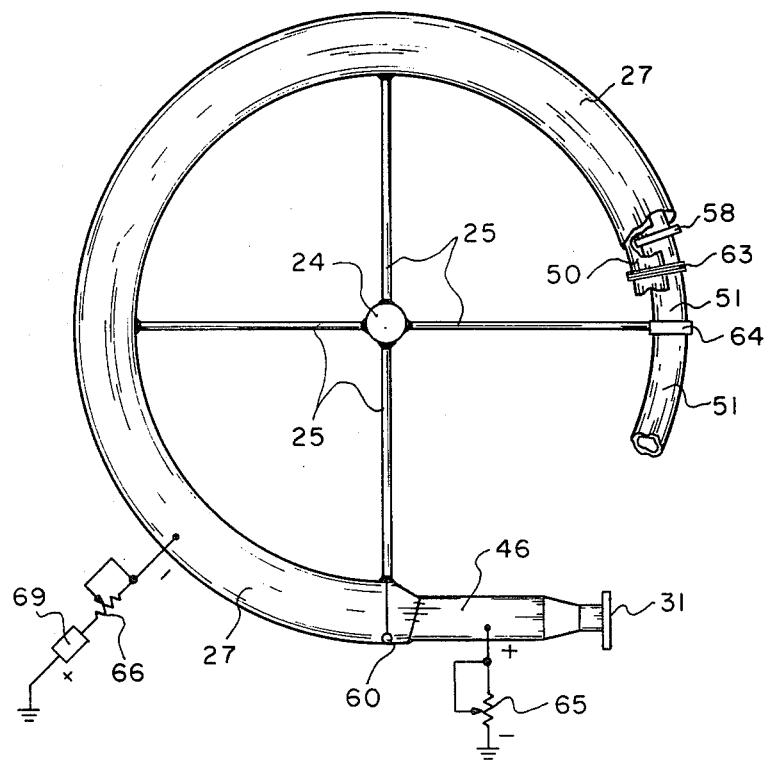
FIG. 9 is a partially cut-away view of the last loop of the reactor helix tube including the reactor system.

In FIG. 9 the terminal loop of helix tube 27 is pictured with a partial cut away to display the interior construction. Inner reaction tube 51 joins at silicon seal 64 to a second 90° section of inner tube 51 mostly hidden inside helix tube 27 which houses sheet metal lamination magnetic core 50 holding tube 51 with epoxy impregnated hemp 63. Ground circuit 65 includes a variable pot resistor connected between the catalyst plug inside of reactor 46 to ground. Electron supply circuit 66 includes a variable pot resistor and DC transformer 69 connecting the interior semi-conductor circuit 68-56 with ground as a source of electrons. The outside radius of helical tube 27 is 92.5 inches. Catalytic reactor 46 is a slate cylinder 3/16 inch thick with a 10 inch inside diameter. Packed inside is a pad of platinum filaments packed tightly along the full length of the slate cylinder. Two copper lead 0/2 guage wires extend the full length of reactor 46 between slate cylinder and platinum catalyst and are attached directly to ground circuit 65. Silicon rubber seal rings are used to connect both ends of reactor 46 to the metal pipe. A volt meter in parallel with ground circuit 65 allows an accurate setting of voltage to aid in control of formation of the hydrogen and oxygen.

Figure 10:
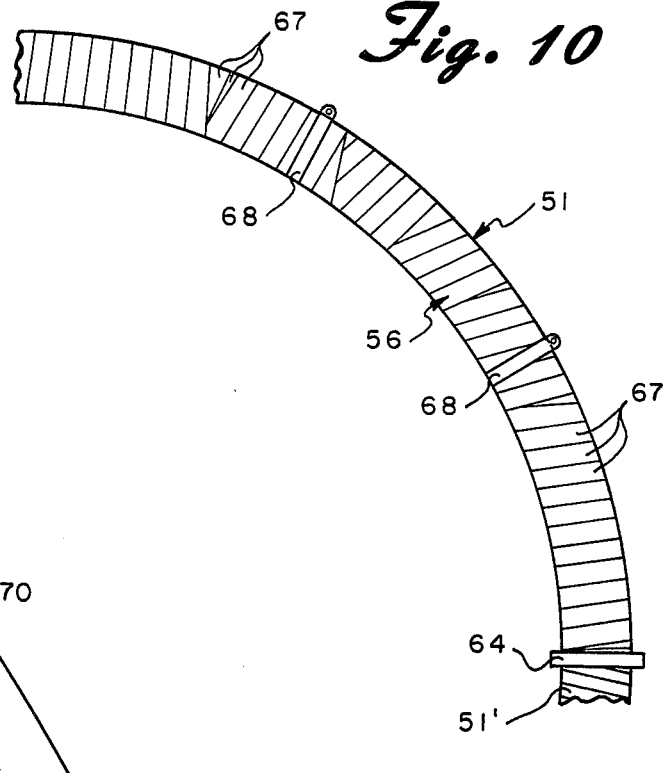
FIG. 10 is a section of inner elliptic laminate tube illustrating inner connection with other elliptic tube sections.
Figure 12:
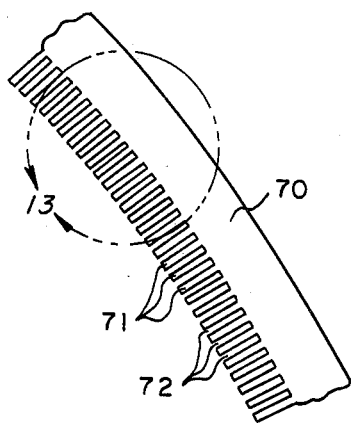
FIG. 12 is an expanded view of a section of the ring shown in FIG. 11 to illustrate the teeth and slots into which the electric coils are wound.
Figure 11:
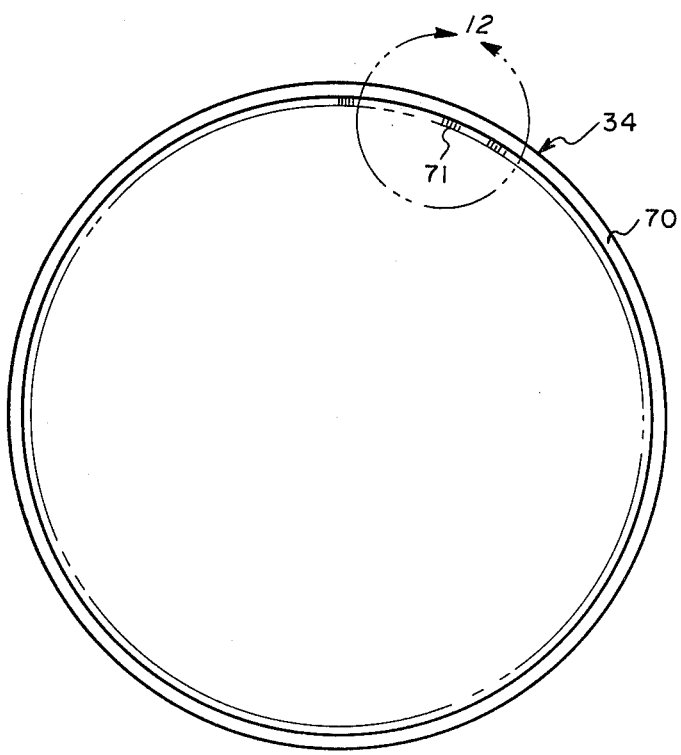
FIG. 11 is a side view of a ring of the exterior magnetic circuit.
Figure 13:
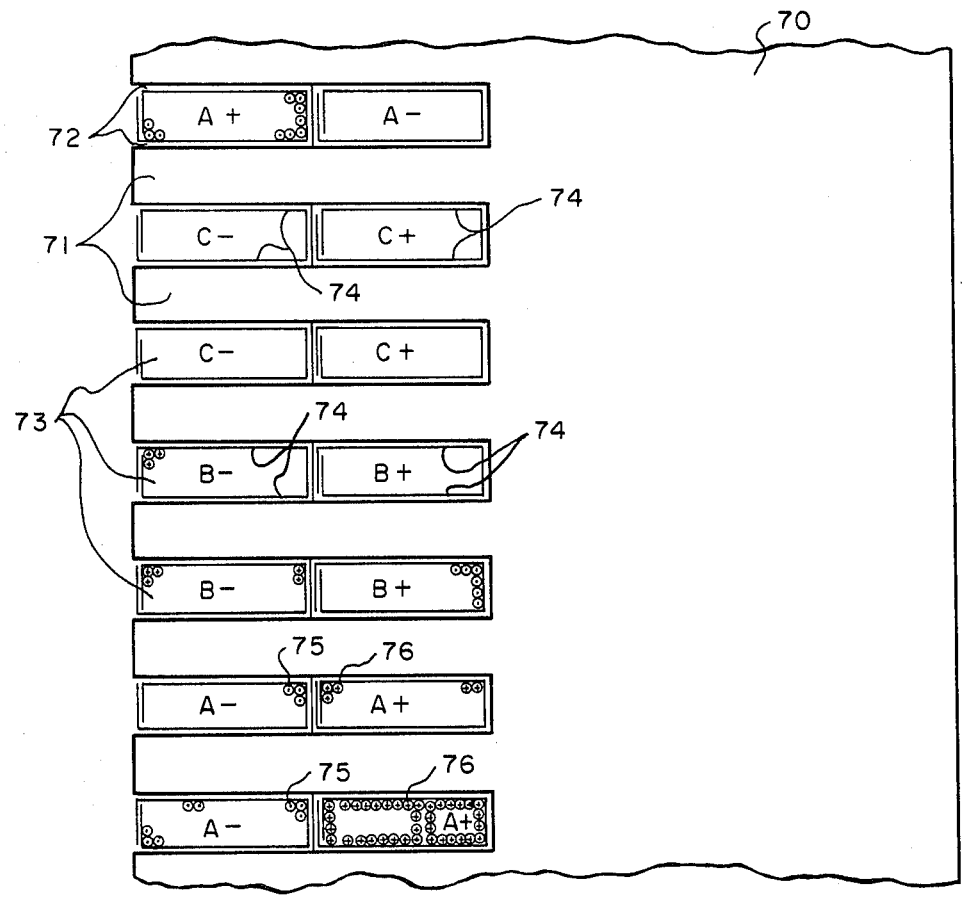
FIG. 13 is a further expanded view illustrating the external windings in the slots.

In FIG. 10 a section together with a partial additional 90° section of a helical elliptic tube 51 is shown constructed of wrapped P-N material tape 67 impregnated. The 90° section of tube 51 is joined with silicon rubber seal 64 to adjacent helical coil 51'. The opposite end of the 90° section of 51 is shown without the seal ready to be attached to the adjacent 90° section. On the outside of elliptical copper inner tube is first wrapped silicon ribbon semi-conductor material P-type 67 and then wrapped with silicon ribbon semi-conductor material N-type 56 all heat sealed to form a P-N junction and hold the material in place. The silicon ribbon is 3″ wide and is wrapped on an overlap to completely cover the outer surface of each layer. Copper electrical connectors 68 connect external semi-conductor material with 0/2 braided copper wire to circuit 66. The current flow is about $4.224 \times 10^{-4}$ amps with an electron flow of $3.094 \times 10^{-7}$ amps/feet$^2$, or $1.932 \times 10^{+12}$ electrons/-seconds feet$^2$. The typical conditions of the steam in passage 52 is a temperature of about 228° F. and a pressure of 5 psig. Conditions inside tube 51 are about 141.5° and 28 inches Hg. External magnetic lamination system 34 is illustrated in FIG. 11 constructed of 22 guage varnished steel plate rings 70 having an eight foot 3½ inch outside radius. The width of ring 70 is about 5½ inches wide. Steel plates 70 of the magnetic circuit are laminated and laquer insulated to prevent eddy currents. The laminations are held together by rivets of high strength plastic or sintered non-magnetic metal. On the inside of ring 70 are a series of teeth 71 which are shown on FIG. 11 for only a small section but are shown in greater detail in FIG. 12. There are 360 slots which are each 1½ inch deep in which magnetic coils are wound. There are thirty sets of poles in the external magnetic system 34 with the length of circuit about 17 feet in length. Each pole phase is 9.7 inches long with each slot 72 about 0.81 inch wide. As illustrated in FIG. 13 each pole consists of six coils, two to each phase with a total of 360 coils required for the circuit. The magnetic field intensity is about $2.095 \times 10^{-2}$ W/M$^2$ (Tesler). In FIG. 13 an expanded view of a section of magnetic circuit 34 shows varnished copper wire windings 73 wrapped in fish paper 74 for insulation. Some of the wires are shown with the balance left out for clarification purposes. Wires 75 with a "dot" in the center are schematically shown to have a circuit toward the viewer with those wires 76 having an "X" marked in them indicating that the circuit is passing away from the viewer.

Figure 14:
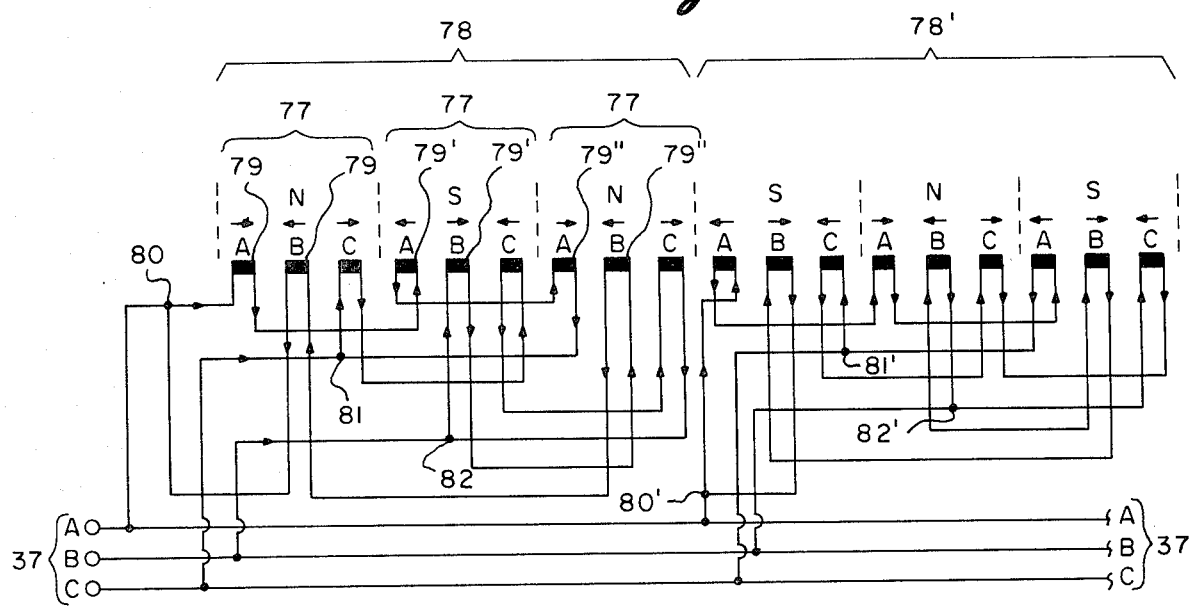
FIG. 14 is a circuit diagram of the external electrical hookup.

In FIG. 14 a circuit diagram is shown for a section of external magnetic circuit 34 illustrating that each of the twenty delta sections 78 includes three poles 77 each including three sets of two coils, each designated by rectangle 79. The phases designated "A", "B" and "C" are wired in series in a delta circuit 78. At any instant of time there are two types of delta connections 78 and 78'. As shown in FIG. 14 delta circuit 78 gives a set of North-South-North poles while at the same instant of time delta circuit 78' gives a set of South-North-South poles. Circuit 34 partially shown in FIG. 14 is wired alternately delta circuit 78 and 78' until all 60 poles are wired requiring 10 sets of circuit 78 and 10 sets of 78'. Sets of 2 coils per phase with coils of each phase (three phases making up a pole) are tied together in series. In the circuit there is a total of 360 coils and for the purposes of clarity, the balance of the circuit is not repeated. Circuit 34 is a delta winding circuit 78 wound to produce a North-South-North pole at a given instant of time in each cycle of the alternating current. The next section of circuit 34 is a second delta winding 78' wound to produce a South-North-South set of poles at the same time 78 produces the opposite set of poles. Circuit 78' produces this set of poles once each cycle of alternating current. The "delta" connected circuit works in the following manner. Bus bars "A", "B", and "C" are each 120° electrically out of phase with each other. The current and voltage in each of these phases follows a sine wave pattern as all alternating current does. If at any instant of time and phase "A" is at the peak of a wave, the positive peakin the voltage wave the other two (2) phases "B" and "C" are slightly negative in voltage. This causes current to flow from bus bar "A" to bus bar "B" and bus bar "C". In the delta winding the current under these conditions flows from "A" post junction 80 (A/B) through three sets of "A" phase poles 79, 79' and 79'', in series to junction 81 (A/C) and back to bus bar "C". At the same time current flows from bus bar "A" in a second path to junction 80 (A/B) then through three sets of phase "B" poles back through junction 82(B/C) to bus bar "B". At the next instant of time when bus bar "B" is at the positive peak of the voltage wave, bus bar "A" and bus bar "C" are slightly negative. In this case current flows from bus bar "B" to the junction 82 (B/C) through three poles of phase windings made up at (C/A) six (6) coils in series to junction 81 and back to bus bar "C". At the same time the current from bus bar "B" follows a second path from bus bar "B" through junction 82 (B/C) through three sets of phase "B" windings to junction 80 (A/B) and back to bus bar "C". The same process occurs between bus bar "C" and "A" and bus bar "C" and "B" when phase "C" reaches its position peak voltage. The two circuits 78 and 78' are first connected to the poles so that current flowing in each phase of 78' circuit is flowing in the opposite direction to the current in the 78 circuit coils. The circuit is repetitive throughout along bus bars 37 with 240 volts between each bus bar (phase) and 120 volts to ground.

While I have described my invention in connection with specific embodiments, it is to be clearly understood that this description is made only by way of example and not of limitation to the scope of my invention as set forth in the following claims.

I claim:

1. An apparatus to disassociate combustion product compound into its component fuel part and oxygen gases comprising:
   (a) a source of combustion product compound,
   (b) a tube to carry the compound,
   (c) acceleration means to cause the compound to accumulate a high level of velocity kinetic energy, comprising an ionization means to continuously add excess electrons to the compound,
   (d) a porous plug of catalytic metal in the tube in the path of the compound allowing the high velocity compound to pass through the porous plug, and wherein the ionization means comprises the tube constructed of a layer of semi-conductor N-function material on the outside, a P-function material layer next inside, and a non-magnetic layer on the inside in contact with the compound flow.

2. The apparatus of claim 1 wherein the ionization means comprises a tube construction comprising P-function silicone ribbon semi-conductor on the inside and N-function silicone ribbon semi-conductor on the outside.

3. An apparatus to disassociate combustion product compound into its component fuel part and oxygen gases comprising:
   (a) a source of combustion product compound,
   (b) a tube to carry the compound,
   (c) acceleration means to cause the compound to accumulate a high level of velocity kinetic energy, comprising an ionization means to continuously add excess electrons to the compound,
   (d) a porous plug of catalytic metal in the tube in the path of the compound allowing the high velocity compound to pass through the porous plug, and wherein the tube is constructed of a sandwich laminate with an electrically conductive, non-magnetic metal on the inside surface with an N-function material on the outside surface of the tube and a P-function material sandwiched in between the two layers.

4. An apparatus to disassociate combustion product compound into its component fuel part and oxygen gases comprising:
   (a) a supply means for supplying the combustion product compound,
   (b) a tube to carry the compound,
   (c) an external heat source to supply heat to the tube to increase the temperature of the compound flowing in the tube,
   (d) ionization means for adding excess electrons to the compound being carried in the tube,
   (e) acceleration means comprising a rotating sweeping magnetic field to accelerate a swirling velocity to the compound ions in a flow pattern not common with the transport flow of the compound along the tube, to achieve high velocity kinetic energy in the compound,
   (f) a disassociation means to transfer the high velocity kinetic energy of the compound to increase the orbital energy of the atoms to a higher energy level and disassociate the compound into oxygen and combustible gas,
   (g) collecting means to separate, collect and store the oxygen and fuel gases in separate containers, and wherein the ionization means comprises a tube construction of a semi-conductor N-function material on the outside and a P-function material on the next inside nearer but protected from the compound.

5. The apparatus of claim 4 wherein the tube is constructed of a sandwich laminate with an electrically conductive, non-magnetic metal on the inside surface with an N-function material on the outside surface of the tube and a P-function material sandwiched in between the two layers.

6. An apparatus to disassociate combustion product compound into fuel gas and oxygen gas comprising:
   (a) a supply means for supplying the compound,
   (b) a tube to carry the compound,
   (c) an external heat source to supply heat to the tube to increase the temperature of the compound flowing in the tube,
   (d) ionization means for adding excess electrons to the compound comprising the tube having constructed on its outside surface construction of a semi-conductor having a P-N function with the P-function material laminated on the surface of the tube and the N-function material laminated on the outside of the P-function material,
   (e) acceleration means comprising a sweeping magnetic field to accelerate the compound ions and to cause the gaseous mass to accumulate high velocity kinetic energy, and
   (f) a porous plug of catalyst metal means in the tube sealed in the path of the compound to cause the high velocity compound in passing through the porous plug to split the compound ions to form oxygen and fuel gases.

7. The apparatus of claim 6 wherein the tube is a helix coil with an elliptical cross-section.

8. The apparatus of claim 6 wherein the tube is constructed of a sandwich laminate with an electrically conductive, non-magnetic metal on the inside surface with an N-function material on the outside surface of the tube and a P-function material sandwiched in between the two layers.

9. The apparatus of claim 6 wherein the acceleration means is a sweeping magnetic field to accelerate the compound ions in a rotational flow pattern in a direction not common to the transport flow of the compound along the tube.

10. The apparatus of claim 6 wherein the catalyst metal means is a metal chosen form the group consisting of platinum and palladium.

11. An apparatus to disassociate combustion product compound into its fuel gas and oxygen gas components comprising:
    (a) a tube to carry the compound in gaseous form,
    (b) a heat source means to transfer heat to the compound flowing inside the tube,
    (c) ionization means for adding excess electrons to the compound in the tube comprising the tube constructed of a semi-conductor laminate P-function material on the inside and N-function material on the outside,
    (d) a sweeping magnetic field means to accelerate the ionized compound ions and to cause the gaseous mass to accumulate a swirling high velocity kinetic energy, and (e) a porous plug of catalyst metal means in the tube sealed in the path of the compound to cause the high kinetic energy compound to pass through the porous plug during which the compound ions split to form oxygen gas and fuel gas.

12. An apparatus to disassociate combustion product compound comprising a compound chosen from the group consisting of water and a mixture of carbon dioxide and water into its hydrogen and oxygen gases comprising:
(a) a helix coiled tube to carry the compound in gaseous form,
(b) a heat source means to transfer heat to the compound comprising a high temperature working fluid in heat conductive relationship flowing parallel with the transport flow of the compound through the tube,
(c) ionization means for adding excess electrons to the compound in the tube comprising the tube constructed of a sandwich laminate with an electrically conductive, non-magnetic metal layer on the inside surface with an N-function material layer on the outside surface of the tube and a P-function material sandwiched in between the two layers,
(d) a controlled circuit means electrically connected with the ionization means for controlling the adding of excess electrons to the compound,
(e) a sweeping magnetic field means to accelerate the ionized compound ions and to cause the gaseous mass to accumulate a swirling high velocity kinetic energy, the rotational flow of the compound ions being in a direction not common to the flow of the compound along the tube,
(f) disassociation means to transfer the high velocity kinetic energy of the compound to increase the orbital energy of the atoms to a higher energy level and disassociate the compound into oxygen and combustible gas comprising a plug of fine shreddings of platinum metal in a slate cylinder; and
(g) collecting means to separate, collect and store the oxygen and hydrogen gases.

13. An apparatus to disassociate combustion product compound into its component fuel part and oxygen gases comprising:
(a) a source of combustion product compound,
(b) a tube to carry the compound,
(c) acceleration means to cause the compound to accumulate a high level of velocity kinetic energy, comprising an ionization means to add excess electrons to the compound, comprising a tube constructed of a sandwich laminate with an electrically conductive, non-magnetic metal on the inside surface with an N-function material on the outside surface of the tube and a P-function material sandwiched in between the two layers,
(d) a porous plug of catalytic metal in the tube in the path of the compound allowing the high velocity compound to pass through the porous plug.

* * * * *